Sept. 18, 1923.  H. A. WEEKS  1,468,586
PISTON FOR INTERNAL COMBUSTION ENGINES
Filed Aug. 3, 1922
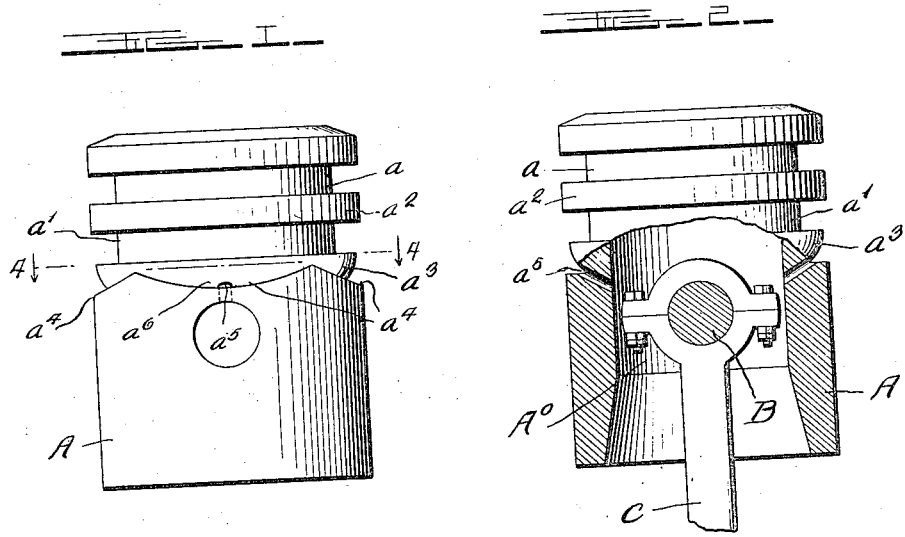
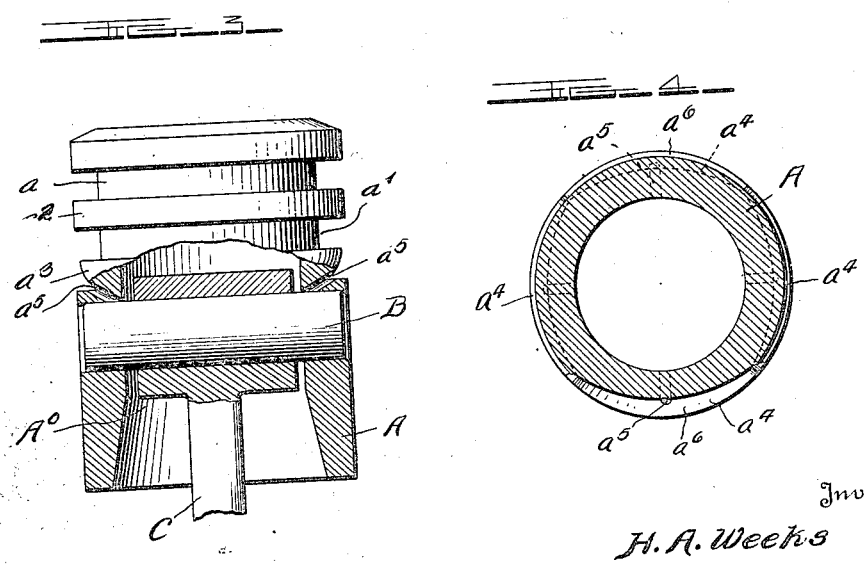
Inventor
H. A. Weeks
By Wilkinson & Fiusta,
Attorneys Patented Sept. 18, 1923.

1,468,586

UNITED STATES PATENT OFFICE.

HUGH A. WEEKS, OF WHITAKERS, NORTH CAROLINA.

PISTON FOR INTERNAL-COMBUSTION ENGINES.

Application filed August 3, 1922. Serial No. 579,536.

*To all whom it may concern:*

Be it known that I, HUGH A. WEEKS, a citizen of the United States, residing at Whitakers, in the county of Edgecombe and State of North Carolina, have invented certain new and useful Improvements in Pistons for Internal-Combustion Engines, of which the following is a specification.

My present invention relates to improvements in hollow metallic pistons for internal combustion engines, and it is intended to provide a special arrangement of piston of cheap, simple and efficient construction which is adapted to receive the ordinary piston packing rings, and will cause them to scrape the excess of lubricant from the interior of the cylinder and direct it through suitable channels into the hollow interior of the piston, as will be hereinafter more fully described.

My invention will be more fully understood after reference to the accompanying drawings, in which like parts are indicated by similar reference symbols throughout the several views, and in which:—

Figure 1 is a side elevation of the cylinder with the wrist pin and connecting rod removed.

Figure 2 is a similar view to Fig. 1, except that the skirt of the piston is also shown in section, and the wrist pin and connecting rod in elevation.

Figure 3 is a similar view to Fig. 2, except that the section through the skirt of the piston is at right angles to that shown in Fig. 2, and the wrist pin is shown in elevation, and the head of the connecting rod in section; and Figure 4 shows a section along the broken line 4—4 of Fig. 1, and looking in the direction of the arrows.

A represents the body of the piston, which is hollowed out in the usual way as at $A^\circ$. In this piston the wrist pin B is mounted in the usual way, and the head of the connecting rod C is mounted on the wrist pin in the usual way.

As the invention relates exclusively to the construction of the piston, and it is desired to so construct the piston that it may be used with any of the well known types of piston packing rings, such packing rings are not shown; but the piston head is provided with grooves $a$ and $a'$ to receive such packing rings, which grooves are separated by the annular flange $a^2$. Obviously there may be one or more of these grooves.

Below the lower groove the flange $a^3$ is provided, which is of slightly less diameter than the flange $a^2$, and this flange has its lower surface preferably rounded somewhat like the zone of a sphere, as shown most clearly in Figs. 2 and 3.

Below this flange the upper edge of the skirt of the piston is cut away in curves or scalloped, as at $a^4$, and at the base of each of these curves there is a downwardly and inwardly projecting inclined perforation $a^5$, which perforation connects the pocket $a^6$, formed by the lower edge of the curve $a^4$, with the hollow interior of the piston. In Fig. 4 I have shown one of these pockets $a^6$ in plane, and the other pockets in dotted lines to correspond with the broken section line 4—4 of Fig. 1.

The operation of the device will be as follows:

The piston being supplied with suitable packing rings, these packing rings will scrape the excess of lubricant off the interior of the cylinder, and this excess would accumulate in the pockets $a^6$ and would find its way, through the perforations $a^5$, into the hollow portion $A^\circ$ of the piston, and would fall down towards the crank shaft in the usual way. By this special arrangement the excess of lubricant is scraped off from the inner walls of the cylinder and is especially directed towards and conveyed into the hollow chamber $A^\circ$ in the piston and falls downwards in the usual way.

While I have shown the invention in its preferred form, it will be obvious that minor changes might be made in the construction and arrangement of parts which could be used without departing from the spirit of my invention; and I do not mean to limit the invention to such details except as particularly pointed out in the claim.

Having thus described my invention what I claim and desire to secure by Letters Patent of the United States is:—

A hollow piston for use in internal combustion engines provided with an annular groove having an annular flange above said groove rectangular in cross section, and an annular flange below said groove of smaller diameter than the annular flange above the same, the exterior of said last mentioned annular flange being curved downwards and inwards in cross section, with a series of scallops cut in the outer wall of the piston below said last mentioned flange, forming therewith pockets, with downwardly and inwardly inclined perforations connecting the bottom of said pockets with the interior of the piston, the bottom wall of said pockets being at right angles to the axis of the piston, thereby forming a ledge whereby the excess oil is trapped and directed to the interior of the piston.

HUGH A. WEEKS.